Patented Aug. 7, 1956

2,758,109
POLYAZO-DYESTUFFS

Richard Huss, Wilhelm Happe, Arthur Siebert, and Josef Weissert, Frankfurt am Main, Germany, assignors to Farbwerke Hoechst Aktiengesellschaft vormals Meister Lucius und Bruning, Frankfurt am Main Hochst, Germany, a German company No Drawing. Application December 9, 1952,
Serial No. 325,016
Claims priority, application Germany December 22, 1951
7 Claims. (Cl. 260—169)

The present invention relates to poly-azo-dyestuffs; more particularly it relates to the poly-azo-dyestuffs corresponding to the following formula

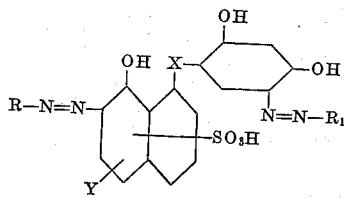

wherein R and $R_1$ represent aromatic radicals at least one of which is the radical of a diphenylamine-sulfonic acid, X stands for one of the groups

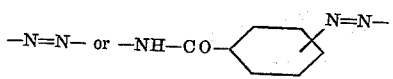

and Y represents hydrogen or the sulfonic acid group.

We have found that poly-azo-dyestuffs dyeing leather valuable brown tints are obtained by coupling the monoazo-dyestuff from a diazotized 1-amino-8-hydroxynaphthalenemono- or di-sulfonic acid or the 3′- or 4′-aminobenzoylamino derivative thereof and 1.3-dihydroxy-benzene with 2 mols of any diazo compound, at least one of which is a diazotized amino-diphenylamine-sulfonic acid.

The new dyestuffs have a high coloring strength, they are very readily soluble in water and resistant to inorganic and organic acids. They are also insensitive to alkalies and formaldehyde. The dyestuffs dye chrometanned leather and leather tanned with vegetable and synthetic tanning agents deep brown tints and they are firmly fixed on the fiber.

In Swiss Patent No. 117,476 a trisazo-dyestuff is described having the composition 1-amino-2-methylbenzene-4-sulfonic acid→1:3-dihydroxy-benzene←1-amino-8-hydroxy-naphthalene-3:6-disulfonic acid←1-amino-4-nitrobenzene which dyes leather a yellowish brown tint, the flesh-side of the leather being dyed a much yellower shade. As compared with this dyestuff, the new dyestuffs which contain in the molecule an amino-diphenylaminesulfonic acid instead of 1-amino-2-methylbenzene-4-sulfonic acid, are distinguished by their particularly fine tints and by an improved solubility. As compared with the known analogous dyestuffs which contain as final component 1 - amino - 2 - methyl-3-chlorobenzene-5-sulfonic acid, 1-aminobenzene-4-sulfonic acid or 1-aminonaphthalene-4-sulfonic acid, the dyestuffs obtainable by the present invention likewise involve the advantage of a considerably improved solubility.

Moreover, the known dyestuffs of the following composition 1-aminobenzene-4-sulfonic acid→1:3-dihydroxybenzene←1-amino-8-hydroxy-naphthalene-4-sulfonic acid or 1 - amino-8-hydroxy-naphthalene-4:6-disulfonic acid ←1-amino-4-nitrobenzene are essentially inferior, as regards fastness to alkalies, to the new dyestuffs which contain an amino-diphenylamine-sulfonic acid instead of 1-aminobenzene-4-sulfonic acid.

The dyestuff 1-amino-2-hydroxy-3:5-dinitrobenzene→ 1:3 - dihydroxy-benzene←1 - amino-8-hydroxy-naphthalene - 3:6 - disulfonic acid←1-amino-4-nitrobenzene described in Swiss Patent No. 116,360 dyes leather dark brown tints. Since this dyestuff is very readily combustible owing to its content of nitro-groups, this product has to be prepared while observing special precautions on grinding the dry powder. The high sensitiveness of the dyestuff powder has also to be taken into consideration when the product is stored. In the manufacturing process it is hardly possible to obtain products yielding uniform dyeings, since shades turning to violet which are undesired in dyeing leather are frequently produced. By exchanging the 1 - amino-2-hydroxy-3:5-dinitrobenzene for an amino-diphenylamine-sulfonic acid according to the present invention, dyestuffs are obtained whose combustibility is considerably reduced and which, moreover, are distinguished by an improved solubility and fastness to alkalies.

The new dyestuffs, therefore, constitute a valuable enrichment in the field of the hitherto known brown leather dyestuffs.

The following examples serve to illustrate the invention, but they are not intended to limit it thereto, the parts being by weight unless otherwise stated, and the relationship of parts by weight to parts by volume being the same as that of the kilogram to the liter:

Example 1

34.1 parts of 1-amino-8-hydroxy-naphthalene-3:6-disulfonic acid (mono-sodium salt) are dissolved with 10.5 parts by volume of sodium hydroxide solution of 33 per cent strength and diazotized with 20 parts by volume of a 5 N-sodium nitrite solution in the presence of 65 parts by volume of 5 N-hydrochloric acid. After the addition of a solution of 11 parts of 1:3-dihydroxy-benzene in 100 parts by volume of water, 18 parts by volume of sodium hydroxide solution of 33 per cent. strength are added dropwise in the course of 90 minutes. When the coupling is complete at the pH-value of 6, the diazo suspension of 26.4 parts of 4-amino-diphenylamine-2-sulfonic acid and such a quantity of 2 N-sodium hydroxide solution are added at 15° C., that the coupling takes place at the pH-value of 9. The disazo-dyestuff is stirred for one night. The clarified diazo solution of 15.2 parts of 1-amino-4-nitrobenzene and such a quantity of 2 N-sodium hydroxide solution are then added dropwise in the course of ½ hour until the pH-value of 4 has been attained. When the coupling is complete, the trisazodyestuff is salted out with common salt, filtered with suction and dried. It is a black-brown powder which dyes chrome-tanned leather or leather tanned with vegetable or synthetic tanning agents deep red-brown tints. The dyestuff, which is also well suitable for brush dyeing, is resistant to acids, alkalies, and formaldehyde and possesses a good fastness to light. It corresponds to the following formula

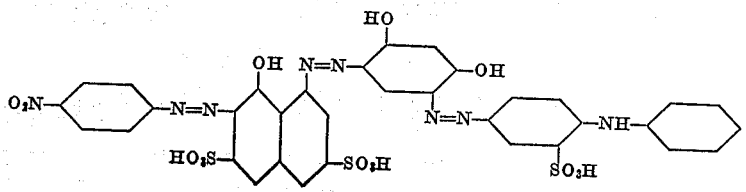

Example 2

The diazo compound from 341 parts of 1-amino-8-hydroxy-naphthalene-3:6-disulfonic acid (mono-sodium salt) is combined at a pH-value of 6 with 110 parts of 1:3-dihydroxy-benzene. The diazo-suspension of 309 parts of 4-amino-4'-nitrodiphenylamine-2'-sulfonic acid and 220 parts by volume of sodium hydroxide solution of 33 per cent. strength are then poured into the solution of the mono-azo-dyestuff thus obtained, whereby a pH-value of 8–9 is attained. When the coupling is complete, the alkaline solution of the disazo-dyestuff obtained is mixed with 20 parts of crystallized sodium acetate, and the clarified diazo-solution of 172.5 parts of 1-amino-2-chloro-4-nitrobenzene is then slowly added to the mixture at a temperature between 10° C. and 15° C. Stirring is continued for 1 hour and the mixture is then salted out with common salt, filtered with suction and dried. The brown-black trisazo-dyestuff dyes the various kinds of leather by drum dyeing, brush dyeing or spray dyeing yellowish brown tints of very good fastness to light, to acids, alkalies and formaldehyde.

Example 3

To the alkaline solution of the disazo-dyestuff from diazotized 1-amino-8-hydroxy-naphthalene-3:6-disulfonic acid, 1:3-dihydroxy-benzene and diazotized 4-amino-diphenylamine-2-sulfonic acid obtainable as described in Example 1 there are added first 20 parts of crystallized sodium acetate and then, in small portions, the diazo-suspension from 30.9 parts of 4-amino-4'-nitrodiphenylamine-2'-sulfonic acid. The pH-value of the coupling medium decreases thereby to 4. After stirring for 1 hour, the mixture is salted out with common salt, filtered with suction and dried. The dark-brown powder dyes leather tanned by various processes red-brown tints which are distinguished by very good fastness to light, formaldehyde, acids and alkalies.

By exchanging in this example the 30.9 parts of 4-amino-4'-nitrodiphenylamine-2'-sulfonic acid for 26.4 parts of 4-amino-diphenylamine-2-sulfonic acid, there is obtained a dyestuff of similar properties.

In the following table are given a number of other azo-dyestuffs of this invention which dye leather similar tints and impart to leather the same good fastness properties:

| | Constitution | | | Tint |
|---|---|---|---|---|
| (1) | 1-Amino-2-chloro-4-nitrobenzene → | 1-amino-8-hydroxy-naphthalene-4-sulfonic acid | | yellowish brown. |
| | 4-amino-4'-nitrodiphenylamine-2'-sulfonic acid → | | 1:3-dihydroxy-benzene | |
| (2) | 1-amino-2-chloro-4-nitrobenzene → | 1-amino-8-hydroxy-naphthalene-5-sulfonic acid | | Do. |
| | 4-amino-4'-nitrodiphenylamine-2'-sulfonic acid → | | 1:3-dihydroxy-benzene | |
| (3) | 1-amino-4-nitro-benzene → | 1-amino-8-hydroxy-naphthalene-4:6-disulfonic acid | | Do. |
| | 4-amino-diphenylamine-2-sulfonic acid → | | 1:3-dihydroxy-benzene | |
| (4) | 1-amino-2-chloro-4-nitrobenzene → | 1-(4'-aminobenzoylamino)-8-hydroxy-napthalene-3:6-disulfonic acid | | reddish brown. |
| | 4-amino-4'-nitrodiphenylamine-2'-sulfonic acid → | | 1:3-dihydroxy-benzene | |
| (5) | 1-amino-2-chloro-4-nitrobenzene → | 1-(3'-aminobenzoylamino)-8-hydroxy-naphthalene-3:6-disulfonic acid | | Do. |
| | 4-amino-4'-nitrodiphenylamine-2'-sulfonic acid → | | 1:3-dihydroxy-benzene | |
| (6) | 1-amino-2-chloro-4-nitrobenzene → | 1-amino-8-hydroxy-naphthalene-3:6-disulfonic acid | | bluish brown. |
| | 4-amino-4'-chloro-diphenylamine-2'-sulfonic acid → | | 1:3-dihydroxy-benzene | |
| (7) | 1-amino-2-nitro-4-methylbenzene → | 1-amino-8-hydroxy-naphthalene-3:6-disulfonic acid | | red-brown. |
| | 4-amino-diphenylamine-2-sulfonic acid → | | 1:3-dihydroxy-benzene | |
| (8) | 4-amino-2':4'-dinitro-diphenyl-amine-6'-sulfonic acid → | 1-amino-8-hydroxy-naphthalene-3:6-disulfonic acid | | reddish yellow-brown. |
| | 1-aminobenzene-4-sulfonic acid → | | 1:3-dihydroxy-benzene | |
| (9) | 1-aminobenzene-4-sulfonic acid → | 1-amino-8-hydroxy-naphthalene-3:6-disulfonic acid | | yellow-brown. |
| | 4-amino-4'-nitrodiphenylamine-2'-sulfonic acid → | | 1:3-dihydroxy-benzene | |
| (10) | 4-aminodiphenyl-amine-2-sulfonic acid → | 1-amino-8-hydroxy-naphthalene-3:6-disulfonic acid | | bluish red-brown. |
| | 4-amino-1:1'-azo-benzene-4'-sulfonic acid → | | 1:3-dihydroxy-benzene | |
| (11) | 4-aminodiphenyl-amine-2-sulfonic acid → | 1-amino-8-hydroxy-naphthalene-3:6-disulfonic acid | | Do. |
| | 1-amino-naphthalene-6-(7)-sulfonic acid (mixture of Cleve's acids) → | | 1:3-dihydroxy-benzene | |
| (12) | 1-amino-2-methyl-3-chlorobenzene-5-sulfonic acid → | 1-amino-8-hydroxy-naphthalene-3:6-disulfonic acid | | deep red-brown. |
| | 4-amino-diphenylamine-2-sulfonic acid → | | 1:3-dihydroxy-benzene | |
| (13) | 4-amino-4'-nitro-diphenylamine-2'-sulfonic acid → | 1-amino-8-hydroxy-naphthalene-3:6-disulfonic acid | | dark red-brown. |
| | 4-amino-4'-nitrodiphenylamine-2'-sulfonic acid → | | 1:3-dihydroxy-benzene | |

We claim:
1. Poly-azo-dyestuffs corresponding to the following general formula

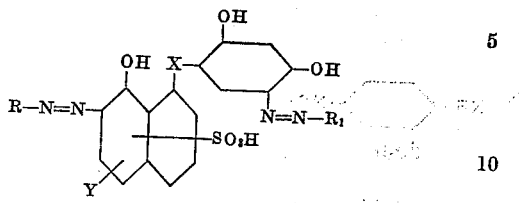

wherein R and R₁ each represents a member selected from the group consisting of radicals of the benzene and naphthalene series, at least one of which is the radical of a diphenylamine-sulfonic acid, X stands for one of the group consisting of —N=N— and

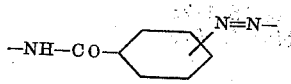

and Y stands for a member of the group consisting of hydrogen and the sulfonic acid group.

2. Poly-azo-dyestuffs corresponding to the following general formula

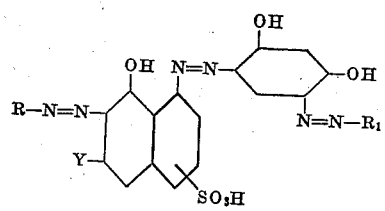

wherein R and R₁ each represents a member selected from the group consisting of radicals of the benzene and naphthalene series, at least one of which is the radical of a diphenylamine-sulfonic acid, and Y stands for a member of the group consisting of hydrogen and the sulfonic acid group.

3. The poly-azo-dyestuff corresponding to the following formula

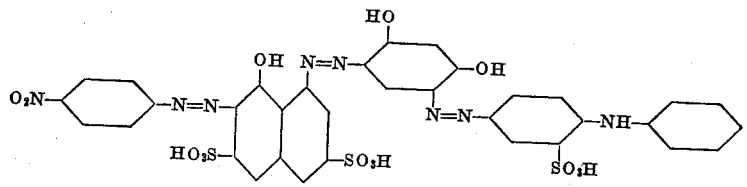

4. The poly-azo-dyestuff corresponding to the following formula

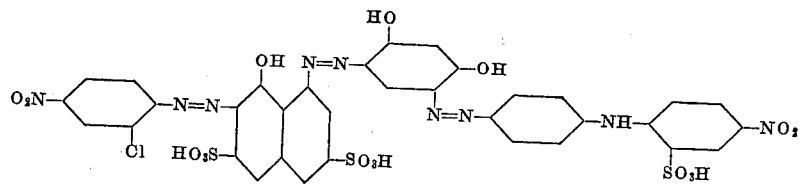

5. The poly-azo-dyestuff corresponding to the following formula

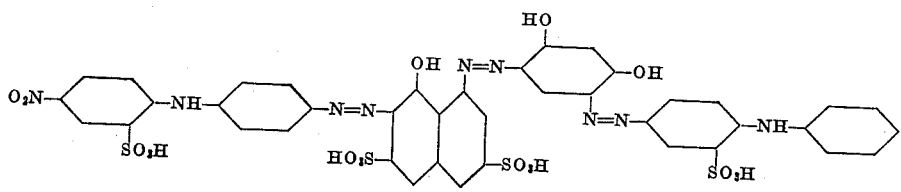

6. The poly-azo-dyestuff corresponding to the following formula

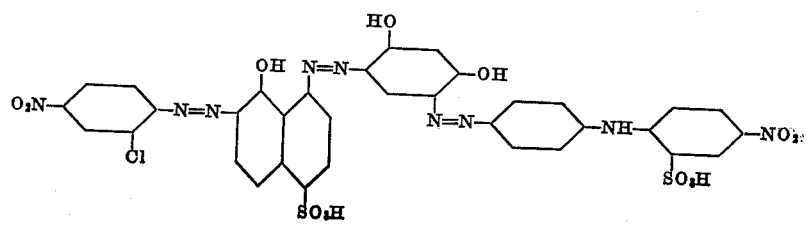

7. The poly-azo-dyestuff corresponding to the following formula
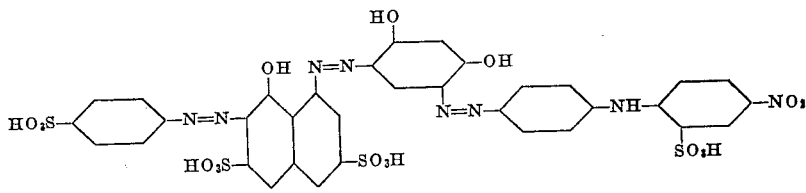
References Cited in the file of this patent
UNITED STATES PATENTS
| | | |
|---|---|---|
| 1,896,710 | Lange | Feb. 7, 1933 |
| 2,276,169 | Dobler et al. | Mar. 10, 1942 |
FOREIGN PATENTS
| | | |
|---|---|---|
| 116,360 | Switzerland | Aug. 16, 1926 |
| 117,476 | Switzerland | Nov. 1, 1926 |